(12) United States Patent
Hagiwara

(10) Patent No.: US 8,175,408 B2
(45) Date of Patent: *May 8, 2012

(54) IMAGE SIGNAL PROCESSING APPARATUS, IMAGE PICKUP APPARATUS, IMAGE SIGNAL PROCESSING METHOD, AND COMPUTER PROGRAM PRODUCT

(75) Inventor: Shigeru Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1240 days.

This patent is subject to a terminal disclaimer.

(21) Appl. No.: 11/974,866

(22) Filed: Oct. 15, 2007

(65) Prior Publication Data

US 2008/0089599 A1 Apr. 17, 2008

(30) Foreign Application Priority Data

Oct. 17, 2006 (JP) ................. P2006-282233

(51) Int. Cl.
G06K 9/40 (2006.01)
H04N 5/335 (2006.01)
H04N 3/14 (2006.01)

(52) U.S. Cl. ............ 382/266; 348/316; 348/324

(58) Field of Classification Search .......... 382/173, 382/274, 284, 266; 348/36, 38, 39, 229.1, 348/230.1, 218.1, 266, 305, 316, 319, 320, 348/321, 322, 323; 358/540
See application file for complete search history.

(56) References Cited

U.S. PATENT DOCUMENTS

| | | | | |
|---|---|---|---|---|
| 5,937,101 A * | 8/1999 | Jeon et al. | | 382/268 |
| 6,337,713 B1 * | 1/2002 | Sato | | 348/311 |
| 6,791,615 B1 * | 9/2004 | Shiomi et al. | | 348/323 |
| 7,236,199 B2 * | 6/2007 | Hori et al. | | 348/321 |
| 7,245,318 B2 * | 7/2007 | Shirakawa | | 348/218.1 |
| 7,295,238 B2 * | 11/2007 | Tanaka et al. | | 348/316 |
| 7,379,104 B2 * | 5/2008 | Hattori et al. | | 348/241 |
| 7,508,435 B2 * | 3/2009 | Loew et al. | | 348/316 |
| 7,554,577 B2 * | 6/2009 | Yokohata et al. | | 348/222.1 |
| 7,876,363 B2 * | 1/2011 | Ovsiannikov | | 348/223.1 |
| 7,889,260 B2 * | 2/2011 | Hagiwara | | 348/316 |
| 2004/0257451 A1 * | 12/2004 | Yamamoto | | 348/207.99 |
| 2005/0007475 A1 * | 1/2005 | Hori et al. | | 348/321 |

FOREIGN PATENT DOCUMENTS

| | | |
|---|---|---|
| JP | 2002 252808 | 9/2002 |
| JP | 2003 143491 | 5/2003 |
| JP | 2004 64404 | 2/2004 |
| JP | 3619077 | 11/2004 |

* cited by examiner

*Primary Examiner* — Andrae S Allison

(74) *Attorney, Agent, or Firm* — Frommer Lawrence & Haug LLP; William S. Frommer; Thomas F. Presson

(57) ABSTRACT

An image signal processing apparatus for performing signal processing with respect to output from an image pickup device, which includes an image signal correcting unit for receiving an output signal corresponding to each of divided areas of the image pickup device to perform correcting processing. The image signal processing unit includes a calculating unit for calculating a total sum of pixel values of a string of pixels on a boundary between the divided areas, and further calculating a difference between the total sums of pixel values corresponding to the respective divided areas, and a correcting unit for making a comparison between the difference calculated by the calculating unit with a predetermined threshold, and then determining a correction mode of a divided area image based on the result of the comparison, followed by performing pixel value correcting processing with respect to the divided area image according to the determined correction mode.

11 Claims, 7 Drawing Sheets

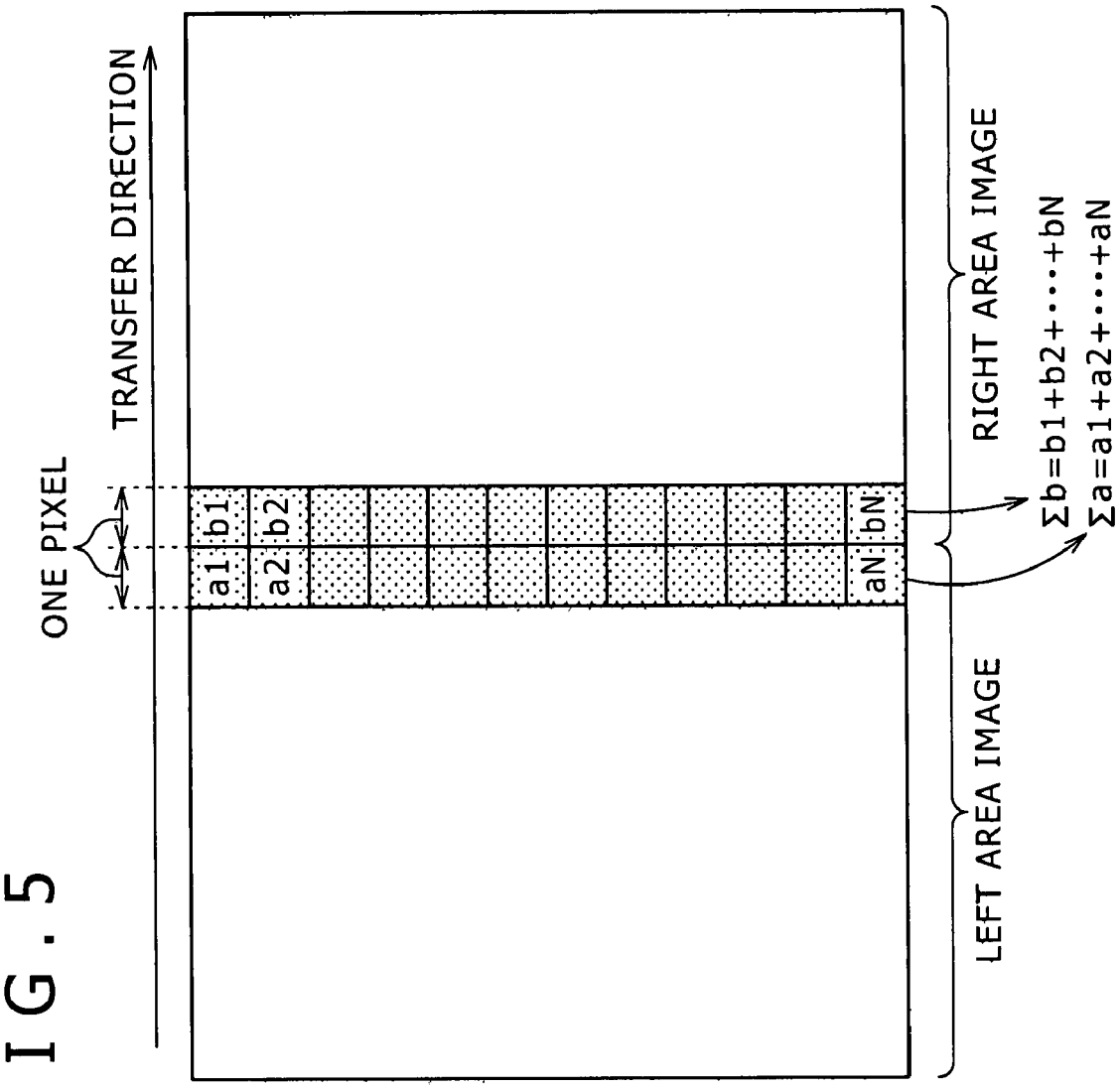

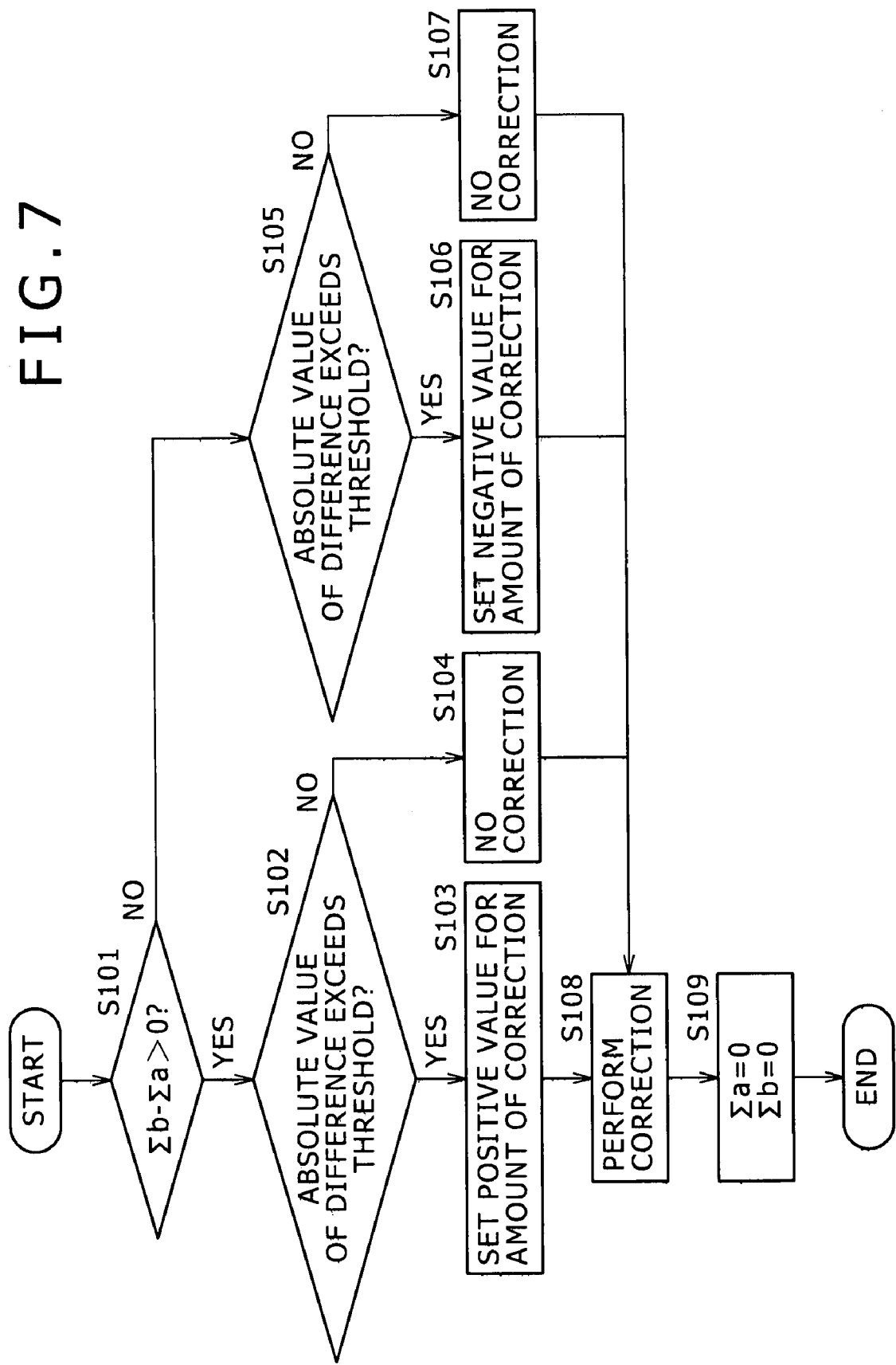

IMAGE SIGNAL PROCESSING APPARATUS, IMAGE PICKUP APPARATUS, IMAGE SIGNAL PROCESSING METHOD, AND COMPUTER PROGRAM PRODUCT

BACKGROUND OF THE INVENTION

1. Field of the Invention

The present invention relates to an image signal processing apparatus, an image pickup apparatus, an image signal processing method and a computer program product. More specifically, the present invention relates to an image signal processing apparatus, an image pickup apparatus, an image signal processing method and a computer program product, which is adapted to perform, by splitting or dividing an image pickup device into more than one section, signal processing on a split or divided section basis, in which a control configuration is included, which is adaptable to eliminate discontinuity of a boundary between split image areas.

2. Description of Related Art

CCDs (Charge Coupled Devices) are widely used as image pickup devices with respect to cameras such as video cameras and still cameras, for instance. In general types of CCDs in related arts, after image pickup information for one frame is detected with a large number of photo detectors (PDs), charge signals resulting from photoelectric conversion are read out through a vertical register and a horizontal register for the sake of conversion into data streams, which are then outputted from one output channel. A CCD of this one-channel output type and its signal processing configuration are described with reference to FIG. 1.

A CCD 10 shown in FIG. 1 has a vertical register 11 for transferring, in a vertical direction, accumulated charges in photo detectors (PDs) as image pickup devices constituting the CCD, a horizontal register 12 for transferring, in a horizontal direction one line at a time, the charges transferred from the vertical register 11, and an output amplifier 13 for converting the charges in the horizontal register 12 into voltage, in which output of the output amplifier 13 is entered into a signal processing unit 21.

The signal processing unit 21 is composed of circuits such as a CDS circuit for performing canceling of noise contained in input signals, an AGC circuit for effecting gain control and an AD converting unit for effecting AD conversion. A digital signal resulting from signal processing in the signal processing unit 21 is once stored in a line memory 22, followed by being outputted through an output unit 23 to provide an output image 30 shown in FIG. 1, for instance.

In recent years, with demands for an increase in signal processing speed and/or in the number of pixels contained in the CCD, there has been proposed one configuration, which performs, by splitting output from the CCD into two or more sections, parallel processing with respect to the split output sections to provide synthesized output. This type of configuration enables faster signal processing to be realized. If two-channel output is given, for instance, it is possible to perform signal processing with respect to output data at an operating frequency as much as a half of an operating frequency for one-channel output.

A two-channel output-adaptive CCD and its signal processing configuration are described with reference to FIG. 2. A CCD 50 shown in FIG. 2 has a vertical register 51 for transferring, in a vertical direction, accumulated charges in photo detectors (PDs) as image pickup devices constituting the CCD, and first and second horizontal registers 52 and 53 for transferring, in a horizontal direction one line at a time, the charges transferred from the vertical register 51. The first horizontal register 52 receives output corresponding to a left half of the photo detectors constituting the CCD, while the second horizontal register 53 receives output corresponding to a right half thereof.

Accumulated data in the first horizontal register 52 is entered into a signal processing unit 61 after the charges are converted into voltage by an output amplifier 54. Accumulated data in the second horizontal register 53 is entered into a signal processing unit 62 after the charges are converted into voltage by an output amplifier 55. The two signal processing units 61 and 62 respectively perform, in parallel, the processing with respect to output data corresponding to the half of the pixels contained in the CCD, the processing of which permits contributions toward realization of high-speed processing.

Data resulting from the signal processing is respectively entered into line memories 63 and 64, and is further synthesized by a multiplexer 65, followed by being outputted through an output unit 66 to provide an output image 70 shown in FIG. 2, for instance.

The configuration shown in FIG. 2 makes it possible to increase an image output speed in such a manner as to perform, by splitting an image pickup area of the CCD into left and right sections, data transfer and signal processing in parallel through the horizontal registers 52 and 53 in the left and the right sections. However, a need exists for use of more than one output amplifiers 54 and 55, causing an output level difference depending on a difference of output amplifier characteristics. Specifically, when with the split CCD output, the split outputs are respectively amplified by the different output amplifiers 54 and 55 as shown in FIG. 2, variations in output data are produced depending on a difference of output amplifier individualities. The output amplifier characteristics depend on manufacturing variations, and it is thus quite difficult to completely match amplifier characteristic values.

The signals having passed through the output amplifiers 54 and 55 are converted into digital signals through the signal processing in the respective signal processing units (blocks of CDS/AGC/AD) 61 and 62, in which case, it is also quite difficult to match CDS/AGC/AD characteristics. As a result, an output image makes an output level difference between left and right images, like the output image 70 shown in FIG. 2.

To make an image pickup area boundary inconspicuous by correcting the difference between the left and the right levels, the output levels of left and right area images have only to be matched. For instance, one technique is included, which is adapted to operate and compare output levels of left and right area images, followed by making correction of one output level so as to match the other. In Japanese Patent Publication No. 3619077 (Patent Document 1), for instance, there is disclosed a level control configuration based on the above technique. However, when applying this technique to the level control configuration, it becomes necessary to make a level comparison after selecting highly correlated pixel areas, or areas having an image of the same subject such as blank areas contained in the left and the right area images, for instance, from pixels of each split area. Accordingly, the processing such as determining of correlativity and selecting of the highly correlated pixel areas is required as for level control. Further, a problem exists that a failure to find any highly correlated pixel area in each split area results in difficulty in carrying out the processing.

In Japanese Patent Application Publication (KOKAI) No. 2002-252808 (patent document 2), there is disclosed a correcting configuration of a type adapted to correct a difference between left and right levels by determining a gain correction value in such a manner as to make leveling of pixel data with respect to left and right channels over more than one line, followed by calculating a difference between the leveled pixel data. However, the configuration of this type also requires the processing with considerations of correlativity between the split areas, resulting in the same problem as the above.

In Japanese Patent Application Publication (KOKAI) No. 2003-143491 (patent document 3), there is disclosed a configuration of a type adapted to make, by installing a control system for independently controlling output from each of left and right channels, adjustment of the control system so as to reduce a level difference. However, the configuration of this type needs to install the control system newly, resulting in a problem of an increase in circuit scale and/or in cost.

In Japanese Patent Application Publication (KOKAI) No. 2004-64404 (patent document 4), there is disclosed a configuration of a type adapted to provide level-controlling data by detecting a level difference between split areas based on image pickup data resulting from image pickup in a light shielded state with an image pickup apparatus, followed by performing level control with respect to the image pickup data. However, the configuration of this type involves a problem of a need for control-parameter acquiring processing before the image pickup.

SUMMARY OF THE INVENTION

The present invention has been undertaken in view of the above problems, and is intended to provide an image signal processing apparatus, an image pickup apparatus, an image signal processing method and a computer program product, which are all adapted to make, with a simple configuration, correction of output signals from a CCD having two or more split outputs, resulting in attainment of elimination discontinuity of a boundary between split image areas.

According to a first embodiment of the present invention, there is provided an image signal processing apparatus for performing signal processing with respect to output from an image pickup device, which includes an image signal correcting unit for receiving an output signal corresponding to each of split areas of the image pickup device to perform correcting processing. The image signal correcting unit includes a calculating unit and a correcting unit. The calculating unit calculates, with respect to each split area, a total sum of pixel values of a string of pixels on a boundary between the above split areas, and further calculates a difference between the total sums of pixel values corresponding to the respective split areas. The correcting unit makes a comparison between the difference calculated by the above calculating unit and a predetermined threshold, and then selects a correction mode of a split area image based on the result of the above comparison, followed by performing pixel value correcting processing with respect to the split area image according to the determined correction mode.

In the embodiment of the image signal processing apparatus according to the present invention, the image signal processing apparatus may further include two or more output amplifiers, two or more signal processing units, and a multiplexer. The output amplifiers output voltage information based on charge information corresponding to each of the split areas of the image pickup device. The signal processing unit receives each output individually from the output amplifiers to generate a digital image signal. The multiplexer synthesizes the outputs from the signal processing units. In the apparatus, the calculating unit is adapted to receive the digital image signal from the multiplexer to perform calculation of the difference, and the correcting unit is adapted to receive the digital image signal from the multiplexer to perform pixel value correcting processing.

Further, in the embodiment of the image signal processing apparatus according to the present invention, the correcting unit may be adapted to perform the pixel value correcting processing so as to change the pixel values of the split area images, when an absolute value of the difference is greater than the threshold, while making no correction when the absolute value of the difference is not more than the threshold.

Furthermore, in the embodiment of the image signal processing apparatus according to the present invention, assuming that the total sum of pixel values of a string of pixels at a boundary on a first split area is expressed as $\Sigma a$, and the total sum of pixel values of a string of pixels at a boundary on a second split area is expressed as $\Sigma b$, the correcting unit is adapted to compare a difference [Sub=$\Sigma b - \Sigma a$] with a predetermined threshold, followed by performing, based on a result of comparison between the difference and the threshold, any one of the following processing (1) to (4):

(1) Correction for raising an image output level of the first split area when the difference [Sub=$\Sigma b - \Sigma a$] is greater than the threshold,
(2) No correction when the difference [Sub=$\Sigma b - \Sigma a$] is neither more than the threshold nor a negative value,
(3) Correction for lowering the image output level of the first split area when the difference [Sub=$\Sigma b - \Sigma a$] is a negative value, and an absolute value |Sub| of Sub exceeds the threshold, and
(4) No correction when the difference [Sub=$\Sigma b - \Sigma a$] is a negative value, and the absolute value |Sub| of Sub is smaller than the threshold.

Furthermore, in the embodiment of the image signal processing apparatus according to the present invention, the correcting unit may be adapted to set a correction amount having an absolute value smaller than the absolute value of the difference to perform correcting processing with respect to each image frame.

According to a second embodiment of the present invention, there is provided an image pickup apparatus which includes: an image pickup unit; and an image signal processing unit for performing signal processing with respect to input signals from the image pickup unit. The image pickup unit is adapted to output an output signal corresponding to each of split areas of an image pickup device, and the image signal processing unit includes an image signal correcting unit for receiving the output signal corresponding to each split area of the image pickup device to perform correcting processing. The image signal correcting unit includes a calculating unit and a correcting unit. The calculating unit calculates, with respect to each split area, a total sum of pixel values of a string of pixels on a boundary between the above split areas, and further calculates a difference between the total sums of pixel values corresponding to the respective split areas. The correcting unit makes a comparison between the difference calculated by the calculating unit and a predetermined threshold, and then selects a correction mode of a split area image based on the result of comparison, followed by performing pixel value correcting processing with respect to the split area image according to the determined correction mode.

According to a third embodiment of the present invention, there is provided an image signal processing method of performing signal processing with respect to output from an image pickup device, which includes an image signal correcting step where an image signal correcting unit receives an output signal corresponding to each of split areas of the image pickup device to perform correcting processing. The above image signal correcting step includes a calculating step and a correcting step. In the calculating step, a calculating unit calculates, with respect to each split area, a total sum of pixel values of a string of pixels on a boundary between the split areas, and further calculates a difference between the total sums of pixel values corresponding to the respective split areas. In the correcting step, a correcting unit makes a comparison between the difference calculated by the calculating unit and a predetermined threshold, and then determines a correction mode of a split area image based on the result of comparison, followed by performing pixel value correcting processing with respect to the split area image according to the determined correction mode.

In the embodiment of the image signal processing method according to the present invention, the correcting step is of performing the pixel value correcting processing so as to change the pixel values of the split area images when an absolute value of the difference is greater than the threshold, while making no correction when the absolute value of the difference is not more than the threshold.

Further, in the embodiment of the image signal processing method according to the present invention, assuming that the total sum of pixel values of a string of pixels on a boundary of a first split area is expressed as $\Sigma a$, and the total sum of pixel values of a string of pixels on a boundary of a second split area is expressed as $\Sigma b$, the correcting step is of comparing the difference [Sub=$\Sigma b-\Sigma a$] with the predetermined threshold, followed by performing any one of the following processing (1) to (4), based on the result of comparison between the difference and the threshold:

(1) Correction for raising an image output level of the first split area when the difference [Sub=$\Sigma b-\Sigma a$] is greater than the threshold,
(2) No correction when the difference [Sub=$\Sigma b-\Sigma a$] is neither more than the threshold nor a negative value,
(3) Correction for lowering the image output level of the first split area when the difference [Sub=$\Sigma b-\Sigma a$] is a negative value, and an absolute value |Sub| of Sub exceeds the threshold, and
(4) No correction when the difference [Sub=$\Sigma b-\Sigma a$] is a negative value, and the absolute value |Sub| of Sub is smaller than the threshold.

Furthermore, in the embodiment of the image signal processing method according to the present invention, the correcting step is of setting a correction amount having an absolute value smaller than the absolute value of the difference to perform the correcting processing with respect to each image frame.

According to a fourth embodiment of the present invention, there is provided a computer program product causing a computer to perform signal processing with respect to output from an image pickup device, which includes an image signal correcting step of causing an image signal correcting unit to receive an output signal corresponding to each of split areas of the image pickup device to perform correcting processing. The image signal correcting step includes a calculating step and a correcting step. The calculating step is of causing a calculating unit to calculate, with respect to each split area, a total sum of pixel values of a string of pixels on a boundary between the split areas, and further calculate a difference between the total sums of pixel values corresponding to the respective split areas. The correcting step is of causing a correcting unit to make a comparison between the difference calculated by the calculating unit with a predetermined threshold, and then determine a correction mode of a split area image based on the result of comparison, followed by performing pixel value correcting processing with respect to the split area image according to the determined correction mode.

It is noted that the computer program product according to the present invention includes, for example, those distributable to general-purpose computer systems adaptable to implement various program codes provided in a computer-readable form, through storage mediums such as CDs, FDs and MOs, or communications mediums such as networks. A processing in accordance with the program is implemented on the computer systems by providing the above types of program product in the computer-readable form.

The foregoing and other objects, features and advantages of the present invention will become apparent from a more detailed description based on the following embodiments of the present invention with reference to the accompanying drawings. It is noted that the system referred to in the present specification includes logical aggregates each composed of more than one apparatus, wherein the apparatuses making up each aggregate are not limited to those contained in the same casing.

BRIEF DESCRIPTION OF THE DRAWINGS

FIG. 5 is a view showing one instance of image correcting processing according to embodiments of present invention;
FIG. 7 is a flowchart showing a sequence of the image correcting processing according to the embodiments the present invention.

DESCRIPTION OF THE EMBODIMENTS

An image signal processing apparatus, an image pickup apparatus, an image signal processing method and a computer program product according to embodiments of the present invention are now described in detail with reference to the accompanying drawings. To begin with, one configuration of the image pickup apparatus, as well as of the image signal processing apparatus, according to one embodiment of the present invention will now be described with reference to FIG. 3.

Figure 1:
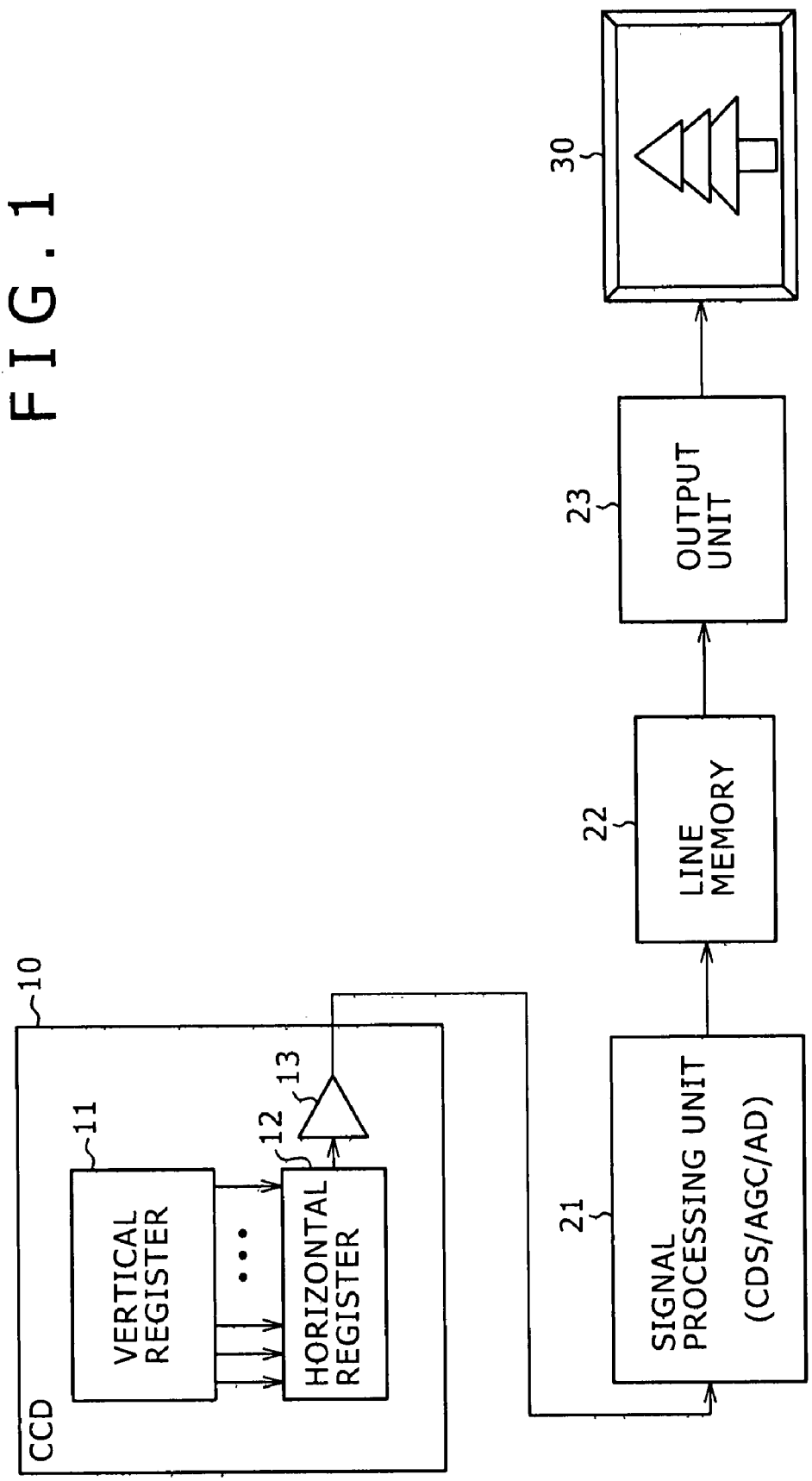
FIG. 1 is a block diagram showing a one-channel output-type CCD and its signal processing configuration.
Figure 2:
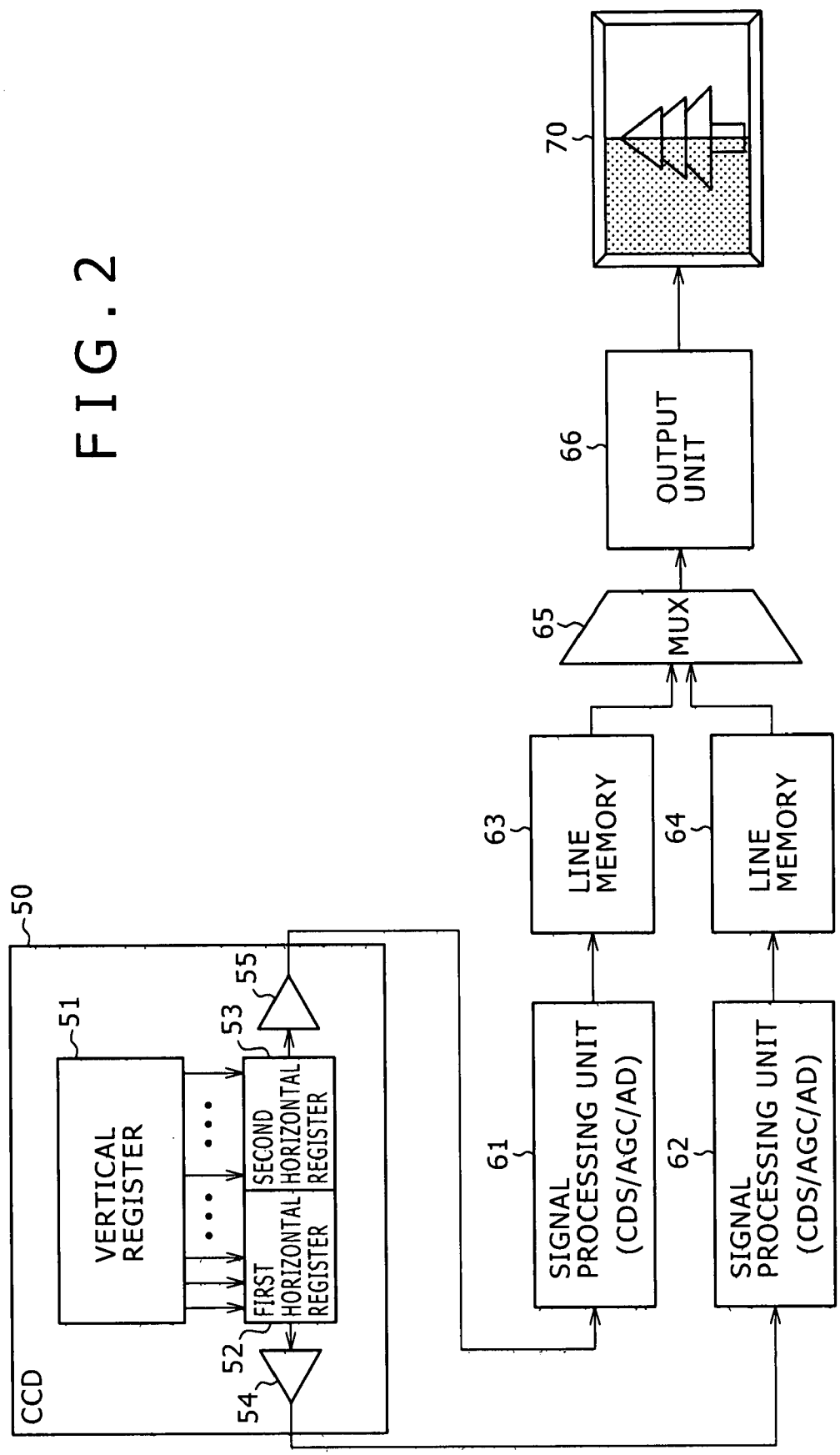
FIG. 2 is a block diagram showing a two-channel output-type CCD and its signal processing configuration.
Figure 3:
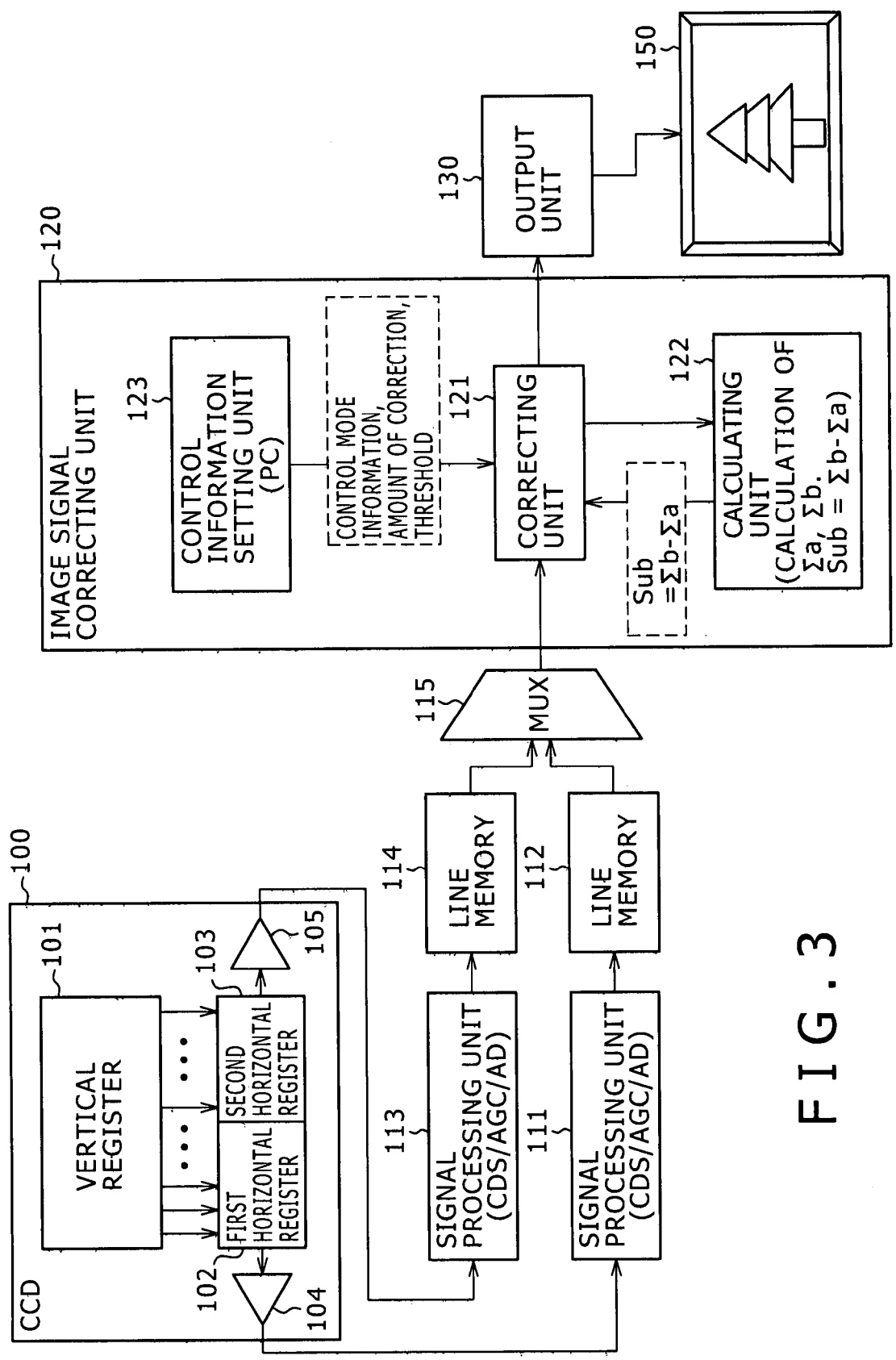
FIG. 3 is a block diagram showing one configuration of an image pickup apparatus, as well as of an image signal processing apparatus, according to one embodiment of the present invention.
Figure 4:
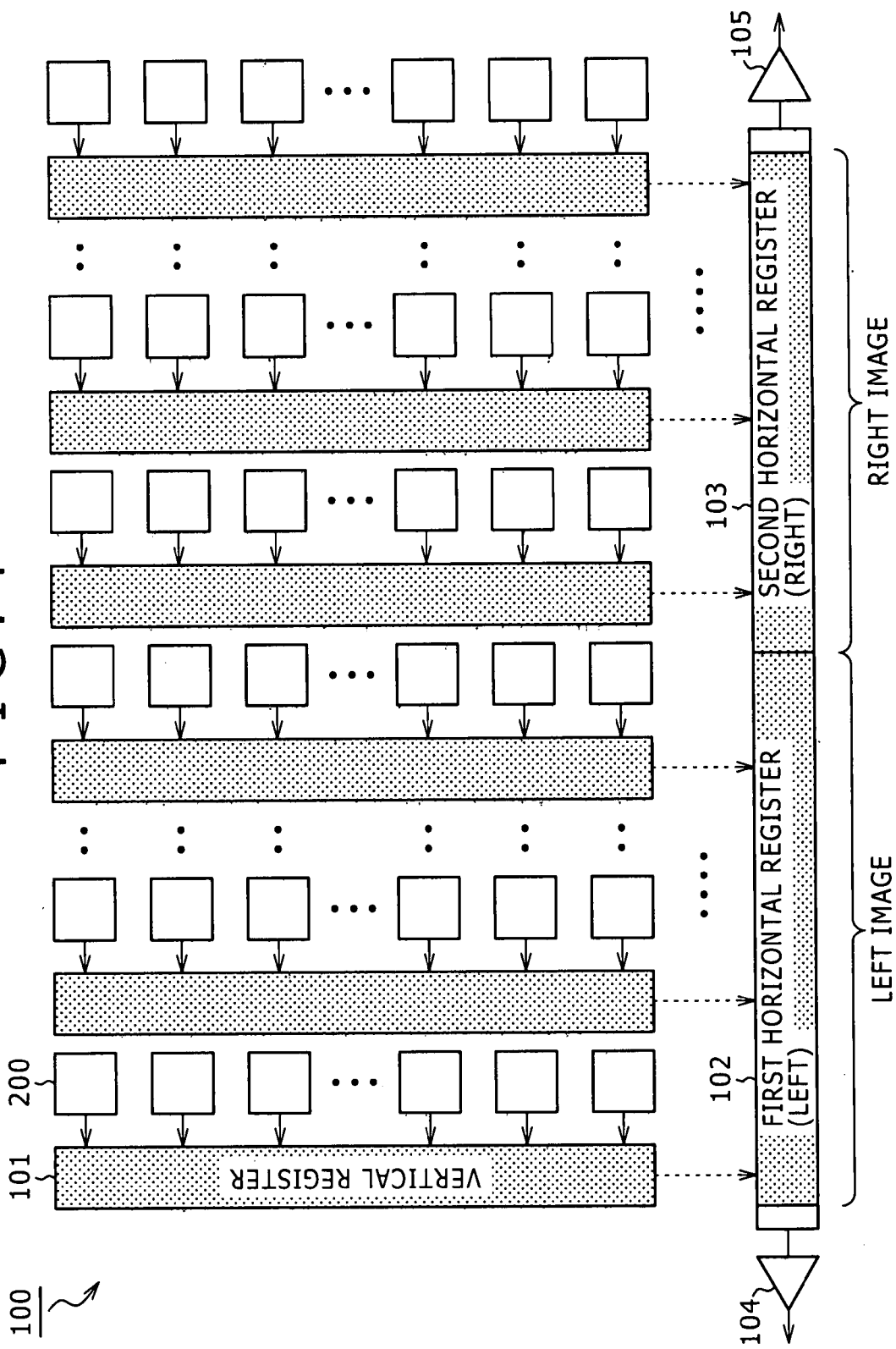
FIG. 4 is a view showing a detailed CCD configuration.

Like the CCD configuration previously described with reference to FIG. 2, a CCD 100 shown in FIG. 3 is split or divided into two or more sections to provide an output configuration on a split section basis. A detailed configuration of the CCD 100 will now be described with reference to FIG. 4.

The CCD 100 has a large number of photo detectors (PDs) 200 being photoelectric converting elements, in which voltage signals based on accumulated charges in these photo detectors (PDs) 200 are outputted. The CCD 100 outputs pixel information from respectively different channels in such a manner as to split an image pickup area for one frame in the center in a horizontal direction. The CCD 100 also has a vertical register 101 and first and second horizontal registers 102 and 103 corresponding to one line. The vertical register 101 is to transfer the accumulated charges in the photo detectors (PDs) 200 on a line basis in a vertical direction.

The first and the second horizontal registers 102 and 103 transfer, on a pixel basis in a horizontal direction, the received charges for one line transferred from the vertical register 101 into first and second output amplifiers 104 and 105 to amplify charge information after being converted into voltage. The first and the second output amplifiers 104 and 105 are to output, as voltage signals, the charge information corresponding to the respective split area images. The image information generated by the photo detectors (PDs) 200 of the CCD 100 in this manner is outputted from two output channels through the first and the second output amplifiers 104 and 105.

Specifically, the first horizontal register 102 outputs, through the first output amplifier 104, a signal based on the charge information outputted from the photo detectors (PDs) 200 included in an area corresponding to a left image, while the second horizontal register 103 outputs, through the second output amplifier 105, a signal based on the charge information outputted from the photo detectors (PDs) 200 included in an area corresponding to a right image.

Referring to FIG. 3 again, the processing with respect to output signals from the first and the second output amplifiers 104 and 105 is now described. Output of the first output amplifier 104 in the CCD 100 or image signal information corresponding to the left image is entered into a first signal processing unit 111. The first signal processing unit 111 is composed of circuits such as a CDS circuit for performing canceling of noise contained in input signals, an AGC circuit for effecting gain control and an AD converting unit for effecting AD conversion. These circuits give effect to the signal processing, causing a 12-bit digital signal (0 (min) to 4095 (max)), for instance, to be generated from an analog signal, followed by being stored in a first line memory 112.

On the other hand, output of the second output amplifier 105 in the CCD 100 or image signal information corresponding to the right image is entered into a second signal processing unit 113. The second signal processing unit 113 is also composed of circuits such as a CDS circuit for performing canceling of noise contained in input signals, an AGC circuit for effecting gain control and an AD converting unit for effecting AD conversion. Likewise, these circuits give effect to the signal processing, causing a 12-bit digital signal (0 (min) to 4095 (max)), for instance, to be generated, followed by being stored in a second line memory 114.

Data to be accumulated in the first line memory 112 corresponds to image data of a left half of the CCD 100, while data to be accumulated in the second line memory 114 corresponds to image data of a right half of the CCD 100. Among the images each for one line stored in the line memories 112 and 114, the left image stored in the first line memory 112 is outputted to a multiplexer (MUX) 115 according to an internal synchronous signal based on FIFO (first-in first-out). On the other hand, the right image stored in the second line memory 114 is outputted to the multiplexer 115 in such a manner as to replace a transfer start position with a transfer end position based on LIFO (last-in first-out) so that the transfer start position of a right image area lies next to the transfer end position of the left image area. Specifically, output from the multiplexer 115 has to be produced such that pixel transfer in a lateral direction appears in succession between the left image area and the right image area.

The output of the multiplexer 115 is entered into a correcting unit 121 of an image signal correcting unit 120, causing pixel value correction to be carried out in the correcting unit 121. The correcting processing is now described with reference to FIG. 5 to FIG. 7.

An image entered into the correcting unit 121 is also entered into a calculating unit 122 through the correcting unit 121. The calculating unit 122 has an internal counter for making a pixel count, in which a count by the internal counter is applied to specify a pixel a on a boundary on a right side of the left area image and a pixel b on a boundary on a left side of the right area image, followed by calculating pixel values of pixels on a boundary between the left and the right area images. Assuming that a pixel value of a pixel a on the boundary on the right side of the left area image on the first line as shown in FIG. 5 is indicated by [a1], and a pixel value of a pixel b on the boundary on the left side of the right area image is indicated by [b1], pixel values of pixels on the boundary between the left and the right area images on each of the second, the third, . . . and the Nth lines are respectively expressed as follows:

[a2], [b2],

[a3], [b3], $\vdots$

[aN], [bN].

If the CCD is of a type available with about 5-mega pixels (5,000,000 pixels), for instance, the pixels are as many as 2448 by 2050 in number, so that a value of N equivalent to the number of effective lines appears as about 2050 to 2048.

The calculating unit 122 calculates:
(a) Total sum of pixel values of a1 to aN pixels on a boundary on the right side of the left area image, and
(b) Total sum of pixel values of b1 to bN pixels on a boundary on the left side of the right area image. Specifically, it calculates:
(a) Total sum of a1 to aN pixel values: Σa=a1+a2+ . . . aN, and
(b) Total sum of b1 to bN pixel values: Σb=b1+b2+ . . . bN.

As described above, the calculating unit 122 is supposed to calculate the total sum Σa by adding up all the pixel values of the pixels on the boundary of the left area image in a longitudinal direction, and the total sum Σb by adding up all the pixel values of the pixels on the boundary of the right area image in the longitudinal direction.

When, following output of the image data of all the areas for one frame from the multiplexer 115 to the correcting unit 121, the calculation of:
(a) Total sum of a1 to aN pixel values: Σa=a1+a2+ . . . aN, and
(b) Total sum of b1 to bN pixel values: Σb=b1+b2+ . . . bN,
is completed in the calculating unit 122, the calculating unit 122 calculates, under control based on the internal synchronous signal, a difference [Sub] between the above total sums of pixel values, that is:

Sub=Σb−Σa, more specifically, a difference [Sub] between the total sums of pixel values of the pixels on the boundary between the left and the right area images, followed by outputting the result of subtraction to the correcting unit 121.

One effective way to reduce discontinuity with respect to the left and the right image areas is to make correction to minimize the difference [Sub] as much as possible. The correcting unit 121 gives effect to, based on the difference [Sub] calculated based on certain one image data, level correction of an image in one of the split image areas for subsequently inputted images, for example, the left area image.

Specifically, after a comparison is made between the difference [Sub=Σb−Σa] and a predetermined threshold, the following processing is performed selectively depending on the result of comparison.
(1) Correction (positive correction) by adding an offset to the left area image to raise a left area image output level when the difference [Sub=Σb−Σa] is greater than the threshold,
(2) No correction when the difference [Sub=Σb−Σa] is neither more than the threshold value nor a negative value,
(3) Correction (negative correction) by subtracting an offset from the left area image to lower the left area image output level when the difference [Sub=τb−Σa] is a negative value, and an absolute value |Sub| of Sub exceeds the threshold, and
(4) No correction when the difference [Sub=Σb−Σa] is a negative value, and the absolute value |Sub| of Sub is smaller than the threshold.

The processing according to any of the above four patterns is supposed to be performed based on the result of comparison between the difference [Sub=Σb−Σa] and the predetermined threshold.

It is noted that the threshold and information on the above correction modes (1) to (4) may be those supplied from a control information setting unit 123 of the equipment such as PCs, for instance. Alternatively, it is also allowable to take a processing configuration which sets up a memory containing the threshold and the information on the above correction modes (1) to (4) in the correcting unit 121 for the sake of application of the information contained in the memory. It is also noted that the information on the above correction modes includes an amount of correction (or the offset).

Among the processing in the above correction modes (1) to (4), those responsible for actual correcting processing with respect to the image are limited to (1) and (3), that is:
(1) Correction (positive correction) by adding an offset to the left area image to raise a left area image output level when the difference [Sub=Σb−Σa] is greater than the threshold, and
(3) Correction (negative correction) by subtracting an offset from the left area image to lower the left area image output level when the difference [Sub=Σb−Σa] is a negative value, and an absolute value |Sub| of Sub exceeds the threshold.

Herein, the offset includes the amount of correction applied to raise or lower the output level, and is equivalent to an amount of shift of a luminance level, for instance. The offset is set based on a certain value of about 0.1% as compared with 100% for a maximum value of quantization. For instance, for the 12-bit digital signal (0 (min) to 4095 (max)) in the luminance level, an equation of 4095×0.1%=4 holds true. Thus, level adjustment is made in the range from −4 to +4 as the luminance level with respect to pixels of a single image. Specifically, the correcting unit 121 is supposed to perform the correcting processing with respect to each image frame continuously after setting the amount of correction having an absolute value smaller than the absolute value of the difference.

The correcting processing applied to the 12-bit digital signal (0 (min) to 4095 (max)) in the luminance level, for instance, includes:
(1) Correction (positive correction) by adding [+4] to the left area image luminance level to raise the left area image output level when the difference [Sub=Σb−Σa] is greater than the threshold, and
(3) Correction (negative correction) by adding [−4] to the left area image luminance level to lower the left area image output level when the difference [Sub=Σb−Σa] is a negative value, and an absolute value |Sub| of Sub exceeds the threshold.

The reason why there is no application of the difference [Sub=Σb−Σa] as it is to the amount of correction (or the offset) is to suppress a phenomenon of oscillation resulting from the correction. The phenomenon of oscillation resulting from the correction is interpreted as that correction on a large scale causes continuously taken image signals to suffer repetition of positive correction and negative correction by turns permanently at each image pickup operation, causing an image in a corrected-side area to get darker and brighter repeatedly. The phenomenon of oscillation as above frequently occurs when there is a great difference between the correlativity of the left and the right area images at a current time and the correlativity of the left and the right area images at a next time.

The present invention makes an attempt to avoid such a phenomenon of oscillation by, after setting the amount of correction at a value of about 0.1% as compared with 100% for the maximum value of quantization level, applying gentle correction to a subsequently captured image at each image pickup operation. The correcting processing as above is performed in an attempt to suppress the oscillation. As previously described, the threshold and the amount of correction (or the offset) may be those supplied from the control information setting unit 123 shown in FIG. 3 to the correcting unit 121, or alternatively, those put into use after being stored in the memory of the correcting unit 121.

The signal processing method according to the embodiment of the present invention described above is adaptive to a high frame rate system of transferring an unnecessary image pickup area at high speed, while transferring an outputted image pickup area as usual. In performing a processing based on the high frame rate system, although the number of lines added up differs depending on a high frame rate setting, it is possible to establish threshold setting and setting of the amount of correction depending on the high frame rate setting, thereby enabling stabled control to be attained. It is noted that the most of CCDs produce variations in sensitivity for each pixel contained, and there are also variations in sensitivity with respect to the contiguous pixels on the boundary between the split areas.

However, as previously described with reference to FIG. 5, the embodiment of the present invention takes the configuration which gives effect to the correction by, after calculating the difference [Sub=Σb−Σa] between the total sums of a string of pixels in a vertical direction on the boundary between the split image areas, determining the above correction modes (1) to (4) selectively based on the difference [Sub=Σb−Σa] between the above total sums, so that the settings obtained are hardly affected by the variations in sensitivity with respect to individual pixels, and are easy to determine a factor of occurrence of the difference with respect to the calculation of the difference [Sub=Σb−Σa] depending on only characteristics of the output amplifiers in the left and right areas, as well as of the signal processing units.

Figure 6A:
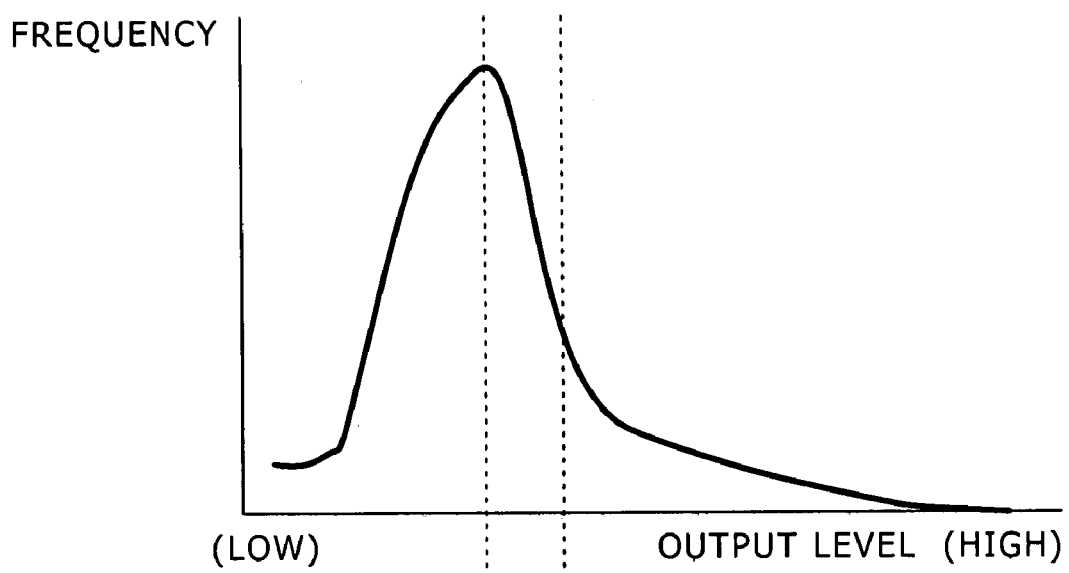
FIG. 6 is a graphic representation illustrating advantages offered by application of a difference [Sub=$\Sigma b-\Sigma a$] between total sums of pixel values of pixels for one line to determine a correction mode.
Figure 6B:
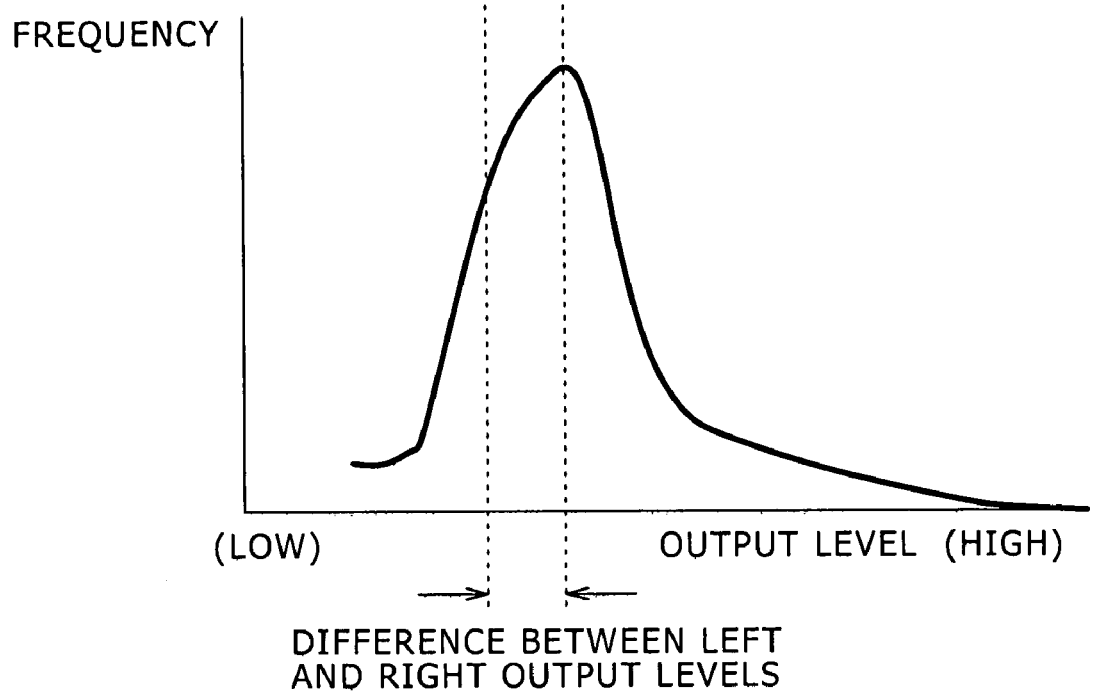

Specifically, the application of the difference [Sub=Σb−Σa] between the total sums of pixel values of the pixels for one line to determine the correction mode results in less effect of the variations in sensitivity with respect to the individual pixels. Advantages with the above are described with reference to FIG. 6. FIG. 6 shows a histogram as a frequency distribution of output levels with respect to one string of pixels on a boundary on each image area of the split areas. The histogram shown in FIG. 6A is a left area histogram, and the histogram shown in FIG. 6B is a right area histogram. A comparison in pixel units causes the difference of variations with respect to a simple pixel to be detected, resulting in an increase of influence of variations. However, the application of a configuration which compares the differences with respect to the total sums of a large number of pixel values in the vertical direction permits the influence of variations with respect to the individual pixels on the difference to be relatively reduced. As a result, as shown in FIGS. 6A and 6B, although the image level distributions resemble in shape, their peaks appear at different positions. A difference between the peak positions is interpreted as a difference in output level (or luminance) between the left area image and the right area image, and the factor of occurrence of the difference of which is obtained as that depending on the characteristics of the output amplifiers in the left and right areas, as well as of the signal processing units.

In the CCD having a great number of pixels as many as several millions, the quite high possibility exists that image pickup of the same substrate of the same subject takes place between two adjacent pixels included in the image pickup area. Thus, it may be said that the difference of the above distributions is not based on the reflection of a difference depending on the subject, but obtained by the reflection of a difference in processing of two series of signal information processing corresponding to the split images, or two series of processing in FIG. 3:

(a) Processing with the first output amplifier 104 and the first signal processing unit 111, and
(b) Processing with the first output amplifier 105 and the first signal processing unit 113.

The image data resulting from the correction with the correcting unit 121 is outputted to an output unit 130 to provide corrected image data 150. As described above, according to the embodiment of the present invention, there is provided the configuration which performs the correction by, after calculating, with the calculating unit 122, the difference [Sub=Σb−Σa] between the total sums of pixel values of the string of the pixels in the vertical direction on the boundary between the split image areas, determining, with the correcting unit 121, the correction modes (1) to (4) selectively based on the difference [Sub=Σb−Σa] between the total sums of the above pixel values. Thus, it becomes possible to correct the level difference occurring depending on only the characteristics of the output amplifiers in the left and right areas, as well as of the signal processing units, in such a manner as to minimize the influence of variations in sensitivity with respect to the individual pixels, resulting in realization of output of the image data 150 of high quality.

According to the configuration of the present invention, it becomes possible to eliminate discontinuity of the boundary appearing on the image pickup area boundary, irrespective of temperature characteristics of the CCD output amplifiers, aperture values of lenses and gain settings of the CDS/GAIN/AD units.

A sequence of the image correcting processing according to the embodiment of the present invention is now described with reference to a flowchart in FIG. 7. The processing of the flow shown in FIG. 7 includes the processing with the correcting unit 121 and the calculating unit 122 included in the configuration shown in FIG. 3. First of all, when the image data of all the areas for one frame is entered into the correcting unit 121 and into the calculating unit 122, the calculating unit 122 performs calculation of the total sums of pixel values of the pixels on the boundary between the split area images, and further calculates the difference [Sub] between the total sums, that is:

$$\text{Sub}=\Sigma b-\Sigma a,$$

followed by supplying the calculated difference to the correcting unit 121. In Step S101, the correcting unit 121 judges whether or not the difference [Sub=Σb−Σa] is greater than 0. Here, the Σa and Σb respectively represent:

(a) Total sum of pixel values of a1 to aN pixels on a boundary on the right side of the left area image: Σa=a1+a2+ . . . aN, and
(b) Total sum of pixel values of b1 to bN pixels on a boundary on the left side of the right area image: Σb=b1+b2+ . . . bN.

When the result of judgment in the Step S101 is that the difference [Sub=Σb−Σa] is of positive values greater than 0, the processing is followed by Step S102 where it is further judged whether or not the absolute value |Sub| of the difference [Sub=Σb−Σa] is greater than the predetermined threshold.

When the result of judgment in the Step S102 is that absolute value |Sub| of the difference [Sub=Σb−Σa] is greater than the predetermined threshold, the processing is followed by Step S103 where a positive value (+value) is set as the amount of correction. Specifically, the setting is performed as to the amount of correction for raising the image output level (or the luminance) of the left area specified as the image area to be corrected. The setting of which is included in the correction amount setting processing corresponding to correction in the correction mode (1), among the above correction modes (1) to (4), that is:

(1) Correction (positive correction) by adding an offset to the left area image to raise a left area image output level, when the absolute value |Sub| of the difference [Sub=Σb−Σa] is greater than the threshold.

On the other hand, when the result of judgment in the Step S102 is that the absolute value |Sub| of the difference [Sub=Σb−Σa] is not greater than the predetermined threshold, the processing is advanced to Step S104 where setting of no correction is established. The setting of which is included in the setting processing corresponding to the processing in the correction mode (2), among the above correction modes (1) to (4), that is:

(2) No correction when the difference [Sub=Σb−Σa] is neither more than the threshold nor a negative value.

On the other hand, when the result of judgment in the Step S101 is that the difference [Sub=Σb−Σa] is not more than 0, the processing is advanced to Step S105 where it is further judged whether or not the absolute value |Sub| of the difference [Sub=Σb−Σa] is greater than the predetermined threshold.

When the result of judgment in the Step S105 is that the absolute value |Sub| of the difference [Sub=Σb−Σa] is greater than the predetermined threshold, the processing is followed by Step S106 where a negative value (minus value) is set as the amount of correction. Specifically, the setting is performed as to the amount of correction for lowering the image output level (or the luminance) of the left area specified as the image area to be corrected. The setting of which is included in the correction amount setting processing corresponding to correction in the correction mode (3), among the above correction modes (1) to (4), that is:

(3) Correction (negative correction) by subtracting an offset from the left area image to lower a left area image output level when the difference [Sub=Σb−Σa] is of negative values, and the absolute |Sub| of Sub exceeds the threshold.

On the other hand, when the result of judgment in the Step S105 is that the absolute value |Sub| of the difference

[Sub=Σb−Σa] is not greater than the predetermined threshold, the processing is advanced to Step S107 where setting of no correction is established. The setting corresponds to the processing in the correction mode (4), among the above correction modes (1) to (4), that is:

(4) No correction when the difference [Sub=Σb−Σa] is of negative values, and the absolute value |Sub| of Sub is smaller than the threshold.

After any one of the correction modes is determined through the processing in the Steps S104 to S107 as described above, the processing is followed by Step S108 where the correction is made based on the determined correction mode. Specifically, in the Step S108, the processing in any one of the following four modes is performed. That is:

(1) Correction (positive correction) by adding an offset to the left area image to raise a left area image output level when the difference [Sub=Σb−Σa] is greater than the threshold,
(2) No correction when the difference [Sub=Σb−Σa] is neither more than the threshold nor a negative value,
(3) Correction (negative correction) by subtracting an offset from the left area image to lower a left area image output level when the difference [Sub=Σb−Σa] is a negative value, and an absolute value |Sub| of Sub exceeds the threshold, and
(4) No correction when the difference [Sub=Σb−Σa] is of negative values, and an absolute value |Sub| of Sub is smaller than the threshold.

Afterwards, the processing is followed by Step S109 to cause the calculating unit 122 to perform resetting of the total sums Σa and Σb of pixel values, leading to an end of the processing. The flow shown in FIG. 7 is repeatedly applied to the image fed into the correcting unit 121, for each predetermined processing time, or on an image frame basis, for example.

It is noted that as previously described, the amount of correction applied to each image is not of values corresponding to the difference, but is set based on the value of about 0.1% as compared with 100% for the maximum value of quantization. Thus, for the 12-bit digital signal (0 (min) to 4095 (max)) in the luminance level, for instance, 4095×0.1%=4 holds true. Specifically, the level (or the luminance) adjustment is supposed to be made in the range from −4 to +4 as the luminance level with respect to the pixels contained in one image. The above level adjustment enables oscillation-controlled correction to be attained.

Although the present invention has been described in detail with reference to the specific embodiments, it will be obvious to those skilled in the art that various modifications and/or variations of the above embodiments may be made without departing from the spirit and scope of the present invention. In other words, it is to be understood that the disclosure of the present invention has been made in the form of embodiments, and the present invention shall be thus interpreted as illustrative and not in a limiting sense. Therefore, the scope of the present invention is to be determined in consideration of the appended claims.

The series of processing previously described in the present specification may be implemented with hardware or software or in a combination of the hardware with the software. In implementing the processing with the software, it is possible to run a program containing the processing sequence through installation into a memory contained in a dedicated hardware-integrated computer or alternatively, through installation into a general-purpose computer adaptable to perform various processing.

A computer program product may be preliminarily recorded in recording mediums such as hard disks and ROMs (Read Only Memories). Alternatively, it is also possible to store or record the computer program product temporarily or permanently in removal recording mediums such as flexible discs, CD-ROMs (Compact Disc Read Only Memories), MOs (Magneto optical) discs, DVDs (Digital Versatile Discs), magnetic discs and semiconductor memories. The above types of removable recording mediums may be provided in the form of so-called package software, for instance.

It is noted that the computer program product is not limited to those installed from the above types of removable recording mediums into the computers, and it is also allowable to transfer the program product from download sites to the computers by radio or by cable over a network including LANs (Local Area Networks) and the Internet, in which case, the computers receive the program product transferred in this manner for installation into their integrated recording mediums such as the hard disks.

It is noted that various processing contained in the present specification is not limited to those implemented in time sequence according to the descriptive procedure, and it is also allowable to perform the above various processing concurrently or individually at need or depending on the processing power of an apparatus adapted to implement the processing. In addition, the system referred to in the present specification includes logical aggregates composed of more than one apparatus, wherein the apparatuses making up each aggregate are not limited to those contained in the same casing.

According to the embodiment of the present invention, in the configuration which receives the output signal corresponding to each of the split areas of the image pickup device to perform the correcting processing, the total sum of pixel values of the string of pixels on the boundary between the split areas is calculated with respect to each split area, and the difference between the total sums of pixel values corresponding to the respective split areas is then calculated, followed by the pixel value correcting processing with respect to the split area image based on the result of comparison between the calculated difference and the predetermined threshold. Specifically, when the absolute value of the difference is greater than the threshold, the processing is performed so as to change the divided area image pixel values. According to the above configuration of the present invention, it is possible to attain efficient pixel correction, or the correction adaptable to eliminate non-contiguity with respect to the split image areas, without needing the processing such as detection of correlativity of each split area.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-282233 filed in the Japanese Patent Office on Oct. 17, 2006, the entire contents of which being incorporated herein by reference.

What is claimed is:
1. An image signal processing apparatus for performing signal processing with respect to output from an image pickup device, comprising:
an image signal correcting unit for receiving an output signal corresponding to each of divided areas of the image pickup device to perform correcting processing, wherein the image signal processing unit includes:
a calculating unit for calculating a total sum of pixel values of a string of pixels on a boundary between the divided areas, and further calculating a difference between the total sums of pixel values corresponding to the respective divided areas, and
a correcting unit for making a comparison between the difference calculated by the calculating unit with a predetermined threshold, and then determining a correction mode of a divided area of the image based on the result of the comparison, followed by performing pixel value correcting processing with respect to the divided area of the image according to the determined correction mode.

2. The image signal processing apparatus according to claim 1, further comprising:
a plurality of output amplifiers for outputting voltage information based on charge information corresponding to each divided area of the image pickup device;
a plurality of signal processing units for receiving each output from the plurality of output amplifiers individually to generate a digital image signal; and
a multiplexer for synthesizing outputs from the plurality of signal processing units; wherein:
the calculating unit is adapted to receive the digital image signal from the multiplexer to perform calculation of the difference; and
the correcting unit is adapted to receive the digital image signal from the multiplexer to perform pixel value correcting processing.

3. The image signal processing apparatus according to claim 2, wherein:
the correcting unit is adapted to perform the pixel value correcting processing so as to change the pixel values of the divided area of the image when an absolute value of the difference is greater than the threshold, while making no correction when the absolute value of the difference is not more than the threshold.

4. The image signal processing apparatus according to claim 1, wherein:
assuming that a total sum of pixel values of a string of pixels on a boundary of a first divided area is expressed as $\Sigma a$, and a total sum of pixel values of a string of pixels on a boundary of a second divided area is expressed as $\Sigma b$, the correcting unit is adapted to, after comparing the difference [Sub=$\Sigma b - \Sigma a$] with the predetermined threshold, perform, based on the result of comparison, any one of the following processing (1) to (4):
(1) Correction for raising an image output level of the first divided area, when the difference [Sub=$\Sigma b - \Sigma a$] is greater than the threshold,
(2) No correction when the difference [Sub=$\Sigma b - \Sigma a$] is neither more than the threshold nor a negative value,
(3) Correction for lowering the image output level of the first divided area when the difference [Sub=$\Sigma b - \Sigma a$] is a negative value, and an absolute value |Sub| of Sub exceeds the threshold, and
(4) No correction when the difference [Sub=$\Sigma b - \Sigma a$] is a negative value, and the absolute value |Sub| of Sub is smaller than the threshold.

5. The image signal processing apparatus according to claim 1, wherein:
the correcting unit is adapted to set a correction amount having an absolute value smaller than the absolute value of the difference to perform the correcting processing with respect to each image frame.

6. An image pickup apparatus having an image pickup unit and an image signal processing unit for performing signal processing with respect to input signals from the image pickup unit, wherein:
the image pickup unit is adapted to output an output signal corresponding to each of divided areas of an image pickup device, the image signal processing unit includes an image signal correcting unit for receiving an output signal corresponding to each divided area of the image pickup device to perform correcting processing, and the image signal processing unit includes a calculating unit for calculating, with respect to each divided area, a total sum of pixel values of a string of pixels on a boundary between the divided areas, and further calculating a difference between the total sums of pixel values corresponding to the respective divided areas; and
a correcting unit for making a comparison between the difference calculated by the calculating unit and a predetermined threshold, and determining a correction mode of a divided area of the image based on the result of comparison, followed by performing pixel value correcting processing with respect to the divided area of the image according to the determined correction mode.

7. An image signal processing method of performing signal processing with respect to output from an image pickup device, comprising:
an image signal correcting step where an image signal correcting unit receives an output signal corresponding to each divided area of the image pickup device to perform correcting processing, wherein the image signal correcting step includes:
a calculating step where a calculating unit calculates, with respect to each divided area, a total sum of pixel values of a string of pixels on a boundary between the divided areas, and further calculates a difference between the total sums of pixel values corresponding to the respective divided areas; and
a correcting step where a correcting unit makes a comparison between the difference calculated by the calculating unit and a predetermined threshold, and determines a correction mode of the divided area of the image based on the result of comparison, followed by performing pixel value correcting processing with respect to the divided area of the image according to the determined correction mode.

8. The image signal processing method according to claim 7, wherein:
the correcting step is of performing the pixel value correcting processing so as to change the pixel values of the divided area of the image when the absolute value of the difference is greater than the threshold, while making no correction when the absolute value of the difference is not more than the threshold.

9. The image signal processing method according to claim 7, wherein:
assuming that a total sum of pixel values of a string of pixels on a boundary of a first divided area is expressed as $\Sigma a$, and a total sum of pixel values of a string of pixels on a boundary of a second divided area is expressed as $\Sigma b$, the correcting step is of, after comparing the difference [Sub=$\Sigma b - \Sigma a$] with the predetermined threshold, performing, based on the result of comparison, carrying out the following processing (1) to (4):
(1) Correction for raising an image output level of the first divided area, when the difference [Sub=$\Sigma b - \Sigma a$] is greater than the threshold, (2) No correction when the difference [Sub=Σb-Σa] is neither more than the threshold nor a negative value, (3) Correction for lowering the image output level of the first divided area when the difference [Sub=Σb—Σa] is a negative value, and an absolute value |Sub| of Sub exceeds the threshold, and (4) No correction when the difference [Sub=Σb-Σa] is a negative value, and the absolute value |Sub| of Sub is smaller than the threshold.

10. The image signal processing method according to claim 7, wherein:

the correcting step is of setting a correction amount having an absolute value smaller than the absolute value of the difference to perform the correcting processing with respect to each image frame.

11. A computer program product stored in a non-transitory computer readable medium for causing a computer to perform signal processing with respect to output from an image pickup device, comprising:

an image signal correcting step of causing an image signal correcting unit to receive an output signal corresponding to each divided area of the image pickup device to perform correcting processing, wherein the image signal correcting step includes:

a calculating step of causing a calculating unit to calculate, with respect to each divided area, a total sum of pixel values of a string of pixels on a boundary between the divided areas, and further calculate a difference between the total sums of pixel values corresponding to the respective divided areas; and a correcting step of causing a correcting unit to make a comparison between the difference calculated by the calculating unit and a predetermined threshold, and determine a correction mode of the divided area of the image based on the result of comparison, followed by performing image pixel correcting processing with respect to the divided area of the image according to the determined correction mode.

* * * * *